United States Patent [19]

Solomon et al.

[11] Patent Number: 5,452,444

[45] Date of Patent: Sep. 19, 1995

[54] DATA PROCESSING SYSTEM USING FLIGH AVAILABILITY DISK ARRAYS FOR HANDLING POWER FAILURE CONDITIONS DURING OPERATION OF THE SYSTEM

[75] Inventors: Robert C. Solomon, Kensington, N.H.; Stephen J. Todd, Shrewsbury, Mass.; Samuel S. Pendleton; Mark C. Lippitt, both of Boulder, Colo.

[73] Assignee: Data General Corporation, Westboro, Mass.

[21] Appl. No.: 390,228

[22] Filed: Feb. 17, 1995

Related U.S. Application Data

[63] Continuation of Ser. No. 851,288, Mar. 10, 1992, abandoned.

[51] Int. Cl.⁶ ............................................. G96F 11/00
[52] U.S. Cl. ................................. 395/182.04; 371/51.1
[58] Field of Search ............... 395/575; 371/51.1, 11.1, 371/66, 10.1

[56] References Cited

U.S. PATENT DOCUMENTS

| | | | |
|---|---|---|---|
| 4,761,785 | 8/1988 | Clark et al. | 371/51 |
| 4,959,774 | 9/1990 | Davis | 364/200 |
| 5,195,100 | 3/1993 | Katz et al. | 371/66 |
| 5,233,618 | 8/1993 | Glider et al. | 371/68.1 |
| 5,274,799 | 12/1993 | Brant et al. | 395/575 |
| 5,305,326 | 4/1994 | Solomon et al. | 371/11.1 |

FOREIGN PATENT DOCUMENTS

| | | |
|---|---|---|
| 0434532A1 | 12/1990 | European Pat. Off. . |
| 0462917A3 | 5/1991 | European Pat. Off. . |
| WO-A-9113405 | 9/1991 | WIPO . |

OTHER PUBLICATIONS

Patterson et al., "A case for Redundant Arrays of Inexpensive Disks" (RAID) University of California, Berkely, Calif., undated.

NCR Disk Array Controller—Application Notes, No. 5, Dec. 16, 1991.

*Proceedings of the 16th VLDB Conference*, Bisbane, Australia, Aug. 13, 1990, pp. 148–161, J. Gray et al. "Parity Striping of Disc Arrays": Low–Cost Reliable Storage with Acceptable Throughput.

*Fault-Tolerant Computing Symposium*, Pittsburgh, Pennsylvania, Jul. 6, 1987, pp. 176–181, Y. Dishon et al., "A Highly Available Storage System Using the Checksum Method."

*Primary Examiner*—Robert W. Beausoliel, Jr.
*Assistant Examiner*—Joseph E. Palys
*Attorney, Agent, or Firm*—Sewall P. Bronstein; Robert F. O'Connell; Brain Michaelis

[57] ABSTRACT

A method for handling data in a plurality of data storage disks having user data sectors and corresponding parity sectors, the method being used when the disks are being operated in a non-degraded or a degraded mode wherein a non-volatile RAM is used in an array control processor which controls the operation of such disks. When new data is to be written into the array, the non-volatile RAM stores information identifying the array, the starting sector into which data is to be written and the number of sectors to be used for writing the new data so that parity and data entries in corresponding sectors can be matched when a power failure occurs. Further, when opening a new array, the data and parity entries in corresponding sectors can be matched and verified, the operation for such matching being performed in between other operations that are being performed by the control processors (i.e., in the "background" thereof).

6 Claims, 4 Drawing Sheets

DATA PROCESSING SYSTEM USING FLIGH AVAILABILITY DISK ARRAYS FOR HANDLING POWER FAILURE CONDITIONS DURING OPERATION OF THE SYSTEM

This is a continuation of application Ser. No. 07/851,288 filed on Mar. 10, 1992, now abandoned.

INTRODUCTION

This invention relates to high availability disk arrays for use in data processing systems and, more particularly, to improved techniques for handling various types of power failure conditions that may occur during operation of the system.

BACKGROUND OF THE INVENTION

A particular disk array system which provides a high degree of availability of the disks thereof has recently been developed, which system is often referred to as a Redundant Array of Inexpensive Disks (RAID). A specific implementation thereof is often referred as a Level 5 array, i.e., a RAID-5 disk array which implementation is described in the article, "A Case For Redundant Arrays of Inexpensive Disks (RAID), David A. Patterson et al., Dept. of Electrical Engineering and Computer Sciences, University of California, Berkeley, Calif. Such system uses an intelligent input/output (I/O) processor for accessing one or more disk modules of the array in response to the needs of a host computer, each disk module of the array being driven by disk drive circuitry operating via the I/O control processor in a manner that effectively appears to the host computer as a single disk drive. A disk module comprises, for example, a disk, disk driver circuitry, and power/control circuitry. Alternatively, in some implementations of such systems, an I/O processor need not be used and the host computer may communicate directly with the disk modules which form an array.

In a particular RAID-5 context, for example, which comprises an array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

Certain kinds of failures, however, can occur in which the array is left in an incoherent or effectively unusable state, e.g., a situation can occur in which there is power failure, i.e., power to the I/O processor (IOP) fails or the I/O processor itself fails due to a hardware defect, or power to the disk drives themselves fails. A further problem can arise, for example, if a power failure results in the need to use a new IOP to replace a failed one and there is no way to identify where a write operation to a sector of the array was taking place after the new IOP has replaced the old IOP.

It is desirable to devise techniques for handling such power failure situations that cannot be handled by RAID-5 systems as currently designed and used.

DESCRIPTION OF THE INVENTION

The invention can be described in more detail with the help of the accompanying drawings wherein FIGS. 1–3 show diagrammatic views of sectors of a stripe in a group of disk modules for various exemplary data/parity situations;

Figure 4:
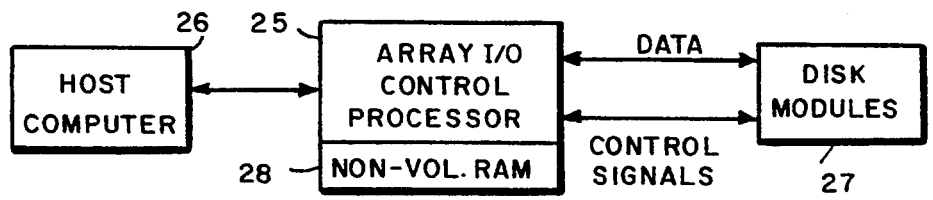
FIG. 4 shows a block diagram of a disk module system of the invention.

FIG. 4 depicts a block diagram of a system in which the invention can be embodied. As seen therein, an array I/O control processor 25 communicates with a host computer and with a plurality of disk modules 27. The I/O control processor 25 includes a non-volatile random-access-memory (RAM) as discussed in more detail below. The control processor controls the write/read operations of the disk modules as well as the operations for opening up an array of disk modules for use in the system and for reconstructing data in a failed disk of the system, as discussed in more detail below. A system may utilize a single I/O processor for controlling an overall multiple array sub-system, or each disk array may have its own corresponding processor associated with it.

Figure 1:
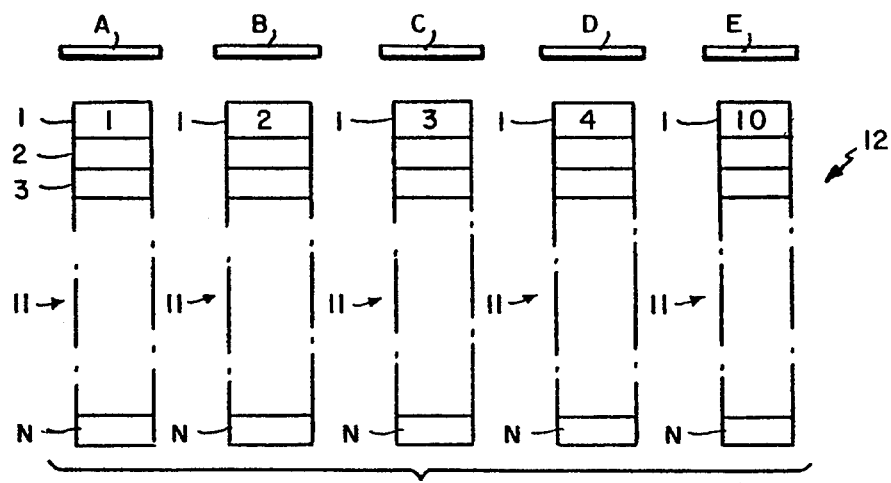

The invention can be better understood by reviewing briefly the concept of a basic RAID system and the use therein of a redundant, or parity, operation, as discussed with reference to FIG. 1. For simplicity in understanding such concept, rather than using complicated digital encoding to describe data stored in the disks of an array, the following discussion represents such data merely by integers, it being realized that such integers are in reality digitally encoded words. The array in FIG. 1, for example, represents a array 10 comprising five disks, the disks being represented by disk units A, B, C, D and E, each having a plurality disk storage sectors 11 used to store data in each disk, exemplary sectors 1, 2, 3, . . . N on each disk being specifically shown diagrammatically in FIG. 1. Corresponding groups of sectors 1 through N on each disk of the five disks, as shown in FIG. 1, represent a stripe 12 of the five disk array depicted. Other corresponding groups of sectors on each disk (not shown) of the type shown in FIG. 1 can represent other stripes of the five disk array.

The disk array, as shown in FIG. 1, may be part of a much larger overall multiple array sub-system which includes other disk arrays. For example, a typical multiple array sub-system may utilize six arrays, each being of the type having five disks as shown in FIG. 1, thereby providing a 30-disk multiple array sub-system, the entire sub-system being appropriately connected to one or more I/O processors for providing access to each of the disks of the multiple array via suitable multiple buses (e.g., via well-known "Small Computer System Interface," or "SCSI," buses), as well as other control buses, as would be known to the art. For simplicity in understanding the invention, a description thereof with reference only to a single stripe of a single array, as in FIG. 1, is provided, it being understood that the same operation occurs with reference to each of the other stripes of the array.

In stripe 12 of FIG. 1, with reference to sector 1 of each of disks A, B, C, D and E, if it is assumed that user data in sector 1 of disks A, B, C and D is represented by integers 1, 2, 3 and 4, respectively, the entry in corresponding sector 1 of disk E (used as the "parity" disk for that stripe) is the sum of the data in the user data sectors, i.e., $1+2+3+4=10$. Data in any one of the sectors, e.g., a sector of a disk that has failed, can be reconstructed by subtracting the data in the other corresponding non-failed sectors of non-failed disks from the parity entry in the parity sector. Thus, assuming a failed disk C, if it is desired to reconstruct the data "3" in sector 1 of failed disk C, for example, such reconstruction can accordingly be made by such subtraction process, e.g., $10-1-2-4=3$.

Figure 2:
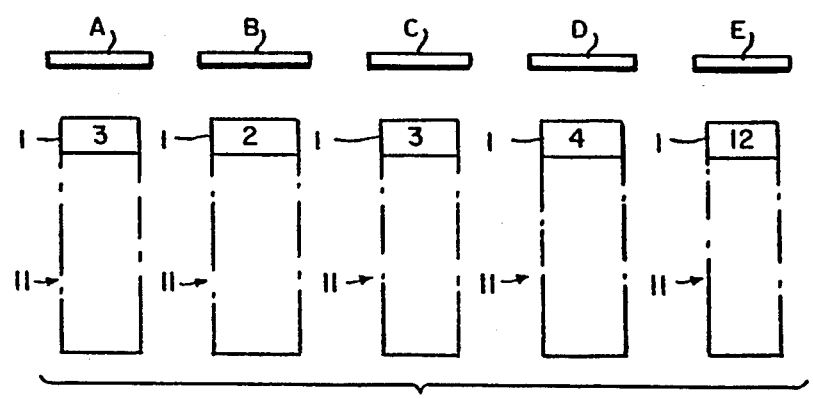

A problem can arise if a power failure described above occurs, e.g., a power failure to the IOP, a hardware failure in the IOP, or a power failure to the disks, after new data has been written into a particular sector of a particular disk, but before the new parity entry can be written into the parity sector. For example, as described with reference to FIG. 2, if new data 3 is written into sector 1 of disk A, a new parity entry should be entered in disk E, namely $3+2+3+4=12$. Such new parity data is normally written as follows. The old data (e.g. "1") in sector 1 of disk A is read and the difference between the new data and the old data in sector 1 of disk A is determined, i.e., $3-1=2$. The new data "3" is then written into sector 1 of disk A. The old parity 10 in sector 1 of disk E is read and is added to the above-determined difference data "2" to obtain a new parity entry "12" which is then written into the parity sector 1 of disk E.

Alternatively, parity can be determined and the parity entered first in the parity disk before the new data is written into the user data disk, or, as a further alternative, the new data and the new parity can be entered substantially simultaneously.

Figure 3:
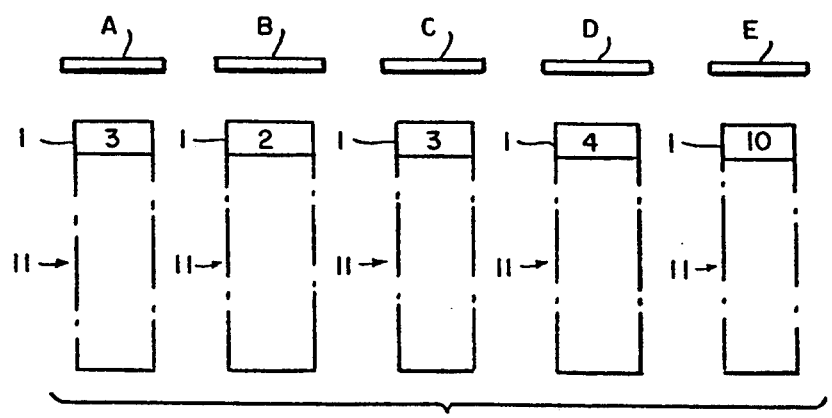

However, if a failure as mentioned above occurs before the new parity entry "12" is written into sector 1 of disk E but after the new data "3" is written into sector 1 of disk A, the data in the sectors 1 of the disks will be as shown in FIG. 3 wherein the old parity 10 remains in sector 1 of disk E while new data 3 is in sector 1 of disk A. Under such conditions, if an attempt is made to reconstruct the data in a failed disk C of the stripe, the reconstructed data will be incorrect (i.e., the reconstructed data $(10-3-2-4)$ will be "1" rather than the correct data "3".

In order to avoid an incorrect reconstruction of data on the failed disk, a non-volatile RAM 28, shown in FIG. 4, is used in the I/O control processor. In accordance with the invention, each time new data is to be written into a sector of a particular disk, the I/O processor stores the following information, concerning the location where the new data is to be written, into the non-volatile RAM (NV-RAM).

1. The particular array of a multiple array system into which the new data is to be written.
2. The particular starting sector in the array in which the new data is to be written. For example, sector 1 of disk A.
3. The number of sectors which are being written into. For example, the data may be written into only one sector.

If multiple I/O processors are used, each processor being associated with a different array of disk modules, each I/O processor will normally use its non-volatile RAM to store information only with respect to its own array.

Where an array is powered up after a failure has occurred and the array has recovered therefrom, before using the data in the array depicted in FIG. 1, the IOP must make sure that there is no discrepancy between the user data in corresponding sectors in each of the disks A, B, C and D of the array and the parity entry in the corresponding parity sector on disk E. That is, the system must determine that the parity correctly matches the current user data in the other corresponding user data sectors. In order to make such determination, the I/O processor scans the NV-RAM to determine where write operations were in progress when the power failure occurred, e.g., the IOP identifies the array, the starting sectors and the number of sectors thereof where write operations were in progress. Then, depending on the data which is currently in the sectors where a write was in progress, the corresponding parity sectors are determined. Thus, if a write was in progress in sector 1 of disk A and the user data in sector 1 of disk A is still the old data "1", the parity is determined as $1+2+3+4=10$. However, if the user data in sector 1 of disk A has been changed to new data 3, the parity is determined as $3+2+3+4=12$. However, if the actual parity in sector 1 of disk E is still "10" the IOP knows that a mismatch exists. The IOP then changes the parity entry in parity sector 1 of disk E to "12" so that it now matches the actual user data in the user data sectors 1 of disk A, B, C and D.

Accordingly, because the write-in-progress location has been correctly identified in the NV-RAM, the parity and the user data of corresponding sectors can always be so matched so that it can be assured that the reconstructed data in a sector of a failed disk will always be consistent with the data that is actually present in the corresponding sectors of the other non-failed disks and with the parity entry in the corresponding parity sector. By such operation, since there will always be a match between the actual user data and the parity in corresponding sectors of a stripe, the I/O processor can be assured, when such match is checked, that data that is reconstructed from the user sector data and parity entry of the non-failed disks correctly represent the data of the failed disk.

In another situation where a new I/O control processor is put into place in the system, that is, either an old I/O control processor is defective or, for some other reason, an old I/O control processor has had to be replaced, or, in a multiple I/O processor system, one of the I/O processors servicing another disk array is requested to service the array previously serviced by the failed processor, the new control processor no longer has the above desired information in its NV-RAM (such NV-RAM is effectively blank) so that it is not possible to bring about a matching of the user data and parity in all of the sectors of the array in which data has been changed since it is not possible to locate where a new write operation was in progress when failure occurred. In such a situation, a further technique of the invention, referred to herein as a "background/verify" operation, is used.

In accordance with such background/verify operation, the host computer continues to perform whatever operations with which it is involved, while the new I/O control processor, when it is not required for such operations, successively reads user data and the corresponding parity in each sector of each disk of the array. In doing so, the new I/O control processor checks each parity entry in each sector and matches the parity entry in each parity sector to whatever user data is actually present in each of the corresponding user sectors. If, during such parity verification process, the new control processor finds that a parity mismatch exists, it corrects the parity entry by using the user data actually found in each corresponding user data sector, even though the control processor is unable to determine what caused the mismatch, i.e., whether the user data in one or more of the user sectors is incorrect or whether the parity entry in the corresponding parity sector is incorrect. The verification obtained by performing such user data/parity matching operation for corresponding sectors is made in between other operations which must be performed by the I/O control processor under command of the host computer (i.e., in the "background" with respect to such other operations), such verification operation by the I/O control processor being effectively invisible to the host computer. Thus, when the verification process is completed, there is an assurance that there are no inconsistencies between the user data stored in each sector and the parity entry in the corresponding parity sector associated with such user data.

Specific implementations of read and write operations which can make use of the non-volatile RAM of the invention and the background/verify technique of the invention are discussed with reference to the flow charts of FIGS. 5–9. Specific programs can be readily created for use by the IOP from such flow charts by those of skill in the art using what is disclosed therein. Such specific programs can be devised for use in any particular I/O processor or host computer system and the creation thereof would be well within the skill of the art from a knowledge of what is disclosed in FIGS. 5–9.

Figure 5:
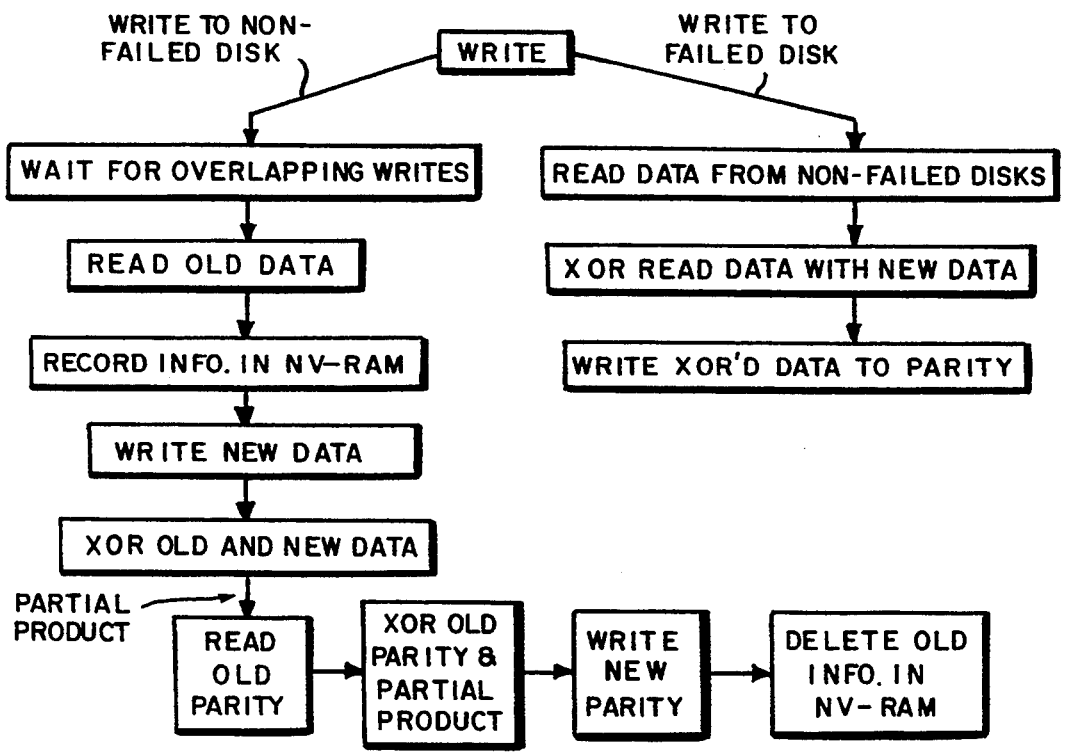
FIG. 5 shows a flow chart for various data write situations.

As can be seen in FIG. 5, for example, a write operation into a sector of an array can occur under a first condition wherein a write is to be made to a non-failed disk of an array in a non-degraded or a degraded mode, and a second condition wherein a write is to be made to a failed disk of an array in a degraded mode.

As can be seen in FIG. 5, in the first condition write mode the IOP waits for overlapping write operations (i.e., other write operation which are concurrently being performed on the same sectors but which are not yet completed) to be completed. Once such concurrent write operations finish, the IOP reads the data currently in the sectors where the new data is to be written (the "old" data) and appropriately records the desired information, as discussed above with respect thereto in the NV-RAM, i.e., information identifying, for such write operation, the array, the starting sector, and the total number of sectors where write operations are to be performed.

For each sector the new data is then written into the desired sector and the old data and new data are XOR'ed to create a partial product. The old parity is read and is then XOR'ed with the partial product to create a new parity. The new parity entry is then written into the parity sector and the information in the NV-RAM with respect to the old data is deleted.

In writing to a failed disk, i.e., in a degraded mode, the data in all of the non-failed disks are read and XOR'ed with the new data (for the failed disk). The XOR'ed data is then written as the parity entry of the parity sector.

Figure 6:
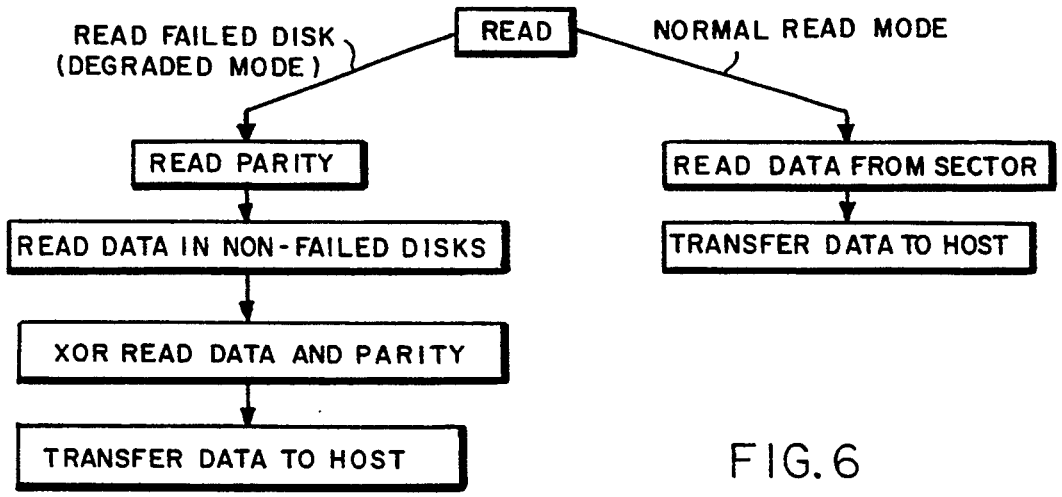
FIG. 6 shows a flow chart for various data read situations.

As shown in FIG. 6, when data is to be read, it is read either from a non-failed disk in a normal, non-degraded mode or in a degraded mode in which there is a failed disk, where the read is to be from the failed disk. In the normal mode the IOP reads the data directly from the desired sector and transfers such data to the host.

In reading from a failed disk in a degraded mode, the entry in the parity sector of the stripe is read and the data in the other non-failed disks are read. The parity entry is XOR'ed with such other data to re-create the data in the failed disk and such data is transferred to the host.

Figure 7:
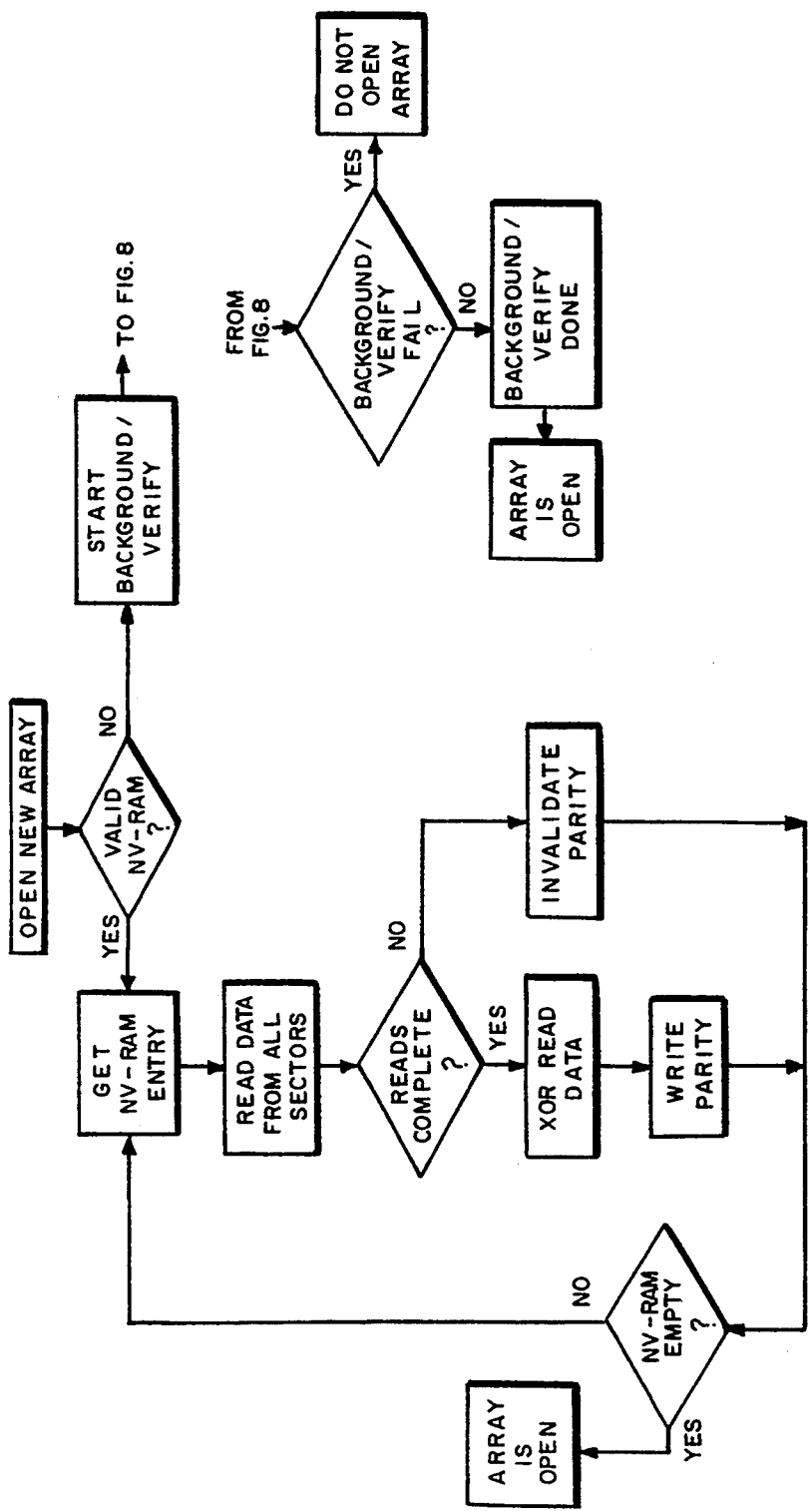
FIG. 7 shows a flow chart for opening an array of disk modules.

FIG. 7 depicts an operation which is performed when a new array of disks, not previously accessed by the system, is to be accessed by the IOP, or an array has been temporarily not available for access but becomes available therefor, often referred to as "opening" an array. As mentioned above, an IOP utilizes a non-volatile RAM for recording stripe and sector identification information with respect to an array. Each array may have entries in the NV-RAM in the IOP and, when opening an array, it must first be determined whether or not there are already entries in the NV-RAM in the IOP for the particular array being opened.

If no valid NV-RAM entries currently exist in the IOP for the array being opened, a background/verify process (see FIG. 8) is initiated by the IOP and if, as discussed below, the new array is not in a degraded mode, the array is opened. If a valid NV-RAM entry is already available in the IOP, the NV-RAM entry for that particular array is obtained and the data from all the user data sectors for that entry are read. When the reads are completed the read data are XOR'ed together to form a parity entry. The parity entry is written into the parity sector and the NV-RAM entry is deleted. The NV-RAM entry for the next sector group (if there is one) is obtained and the process is repeated. Once all NV-RAM entries for this array have been deleted, the array is open.

If, however, the reads in a sector group cannot be completed because the array is in a degraded mode (a sector cannot be read directly on a disk), the parity entry is invalidated for that sector group and nothing further can be done with that NV-RAM entry and the NV-RAM entry is deleted. The process is then repeated for the next NV-RAM entry (if there is one).

Figure 8:
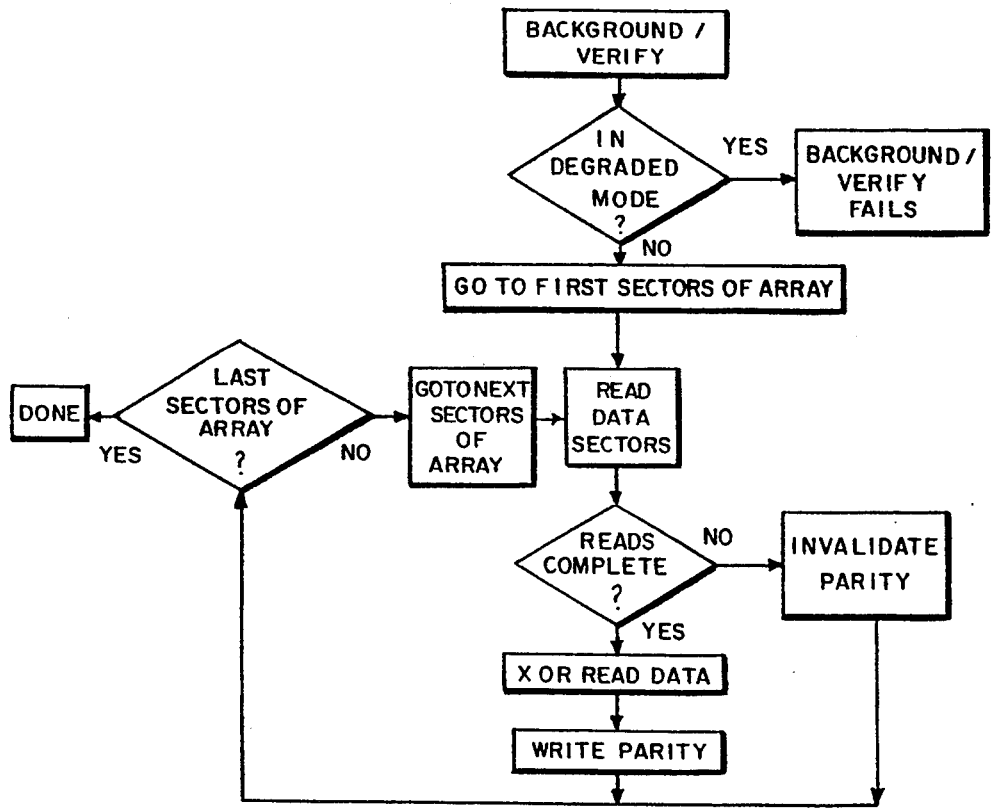
FIG. 8 shows a flow chart for a backgound/verify operation.

The background/verify process mentioned in FIG. 7 is depicted in FIG. 8. The IOP first determines whether or not the array is in a degraded mode. If it is, the background/verify operation fails and the array cannot be opened (see FIG. 7). If the array is not in a degraded mode, the IOP goes to the first sector of each of the disks of an array and reads the data from all user data sectors thereof. If the reads can be completed, the data is XOR'ed together to form a parity entry. The parity is written as the parity entry in the corresponding parity sector. If the corresponding sectors being verified are the final group of corresponding sectors of the array, then the background/verify process is done. If they are not, then the IOP goes to the next group of corresponding sectors and performs the same operations until the background/verify process for the array is done.

If in processing a group of corresponding sectors the reads of the data in the user data sectors cannot be completed, the corresponding parity is invalidated for that sector group and the IOP either goes to the next group of sectors or, if that is the last sector group, the operation is completed for the array. When the background/verify operation is done the array is opened (see FIG. 7).

Figure 9:
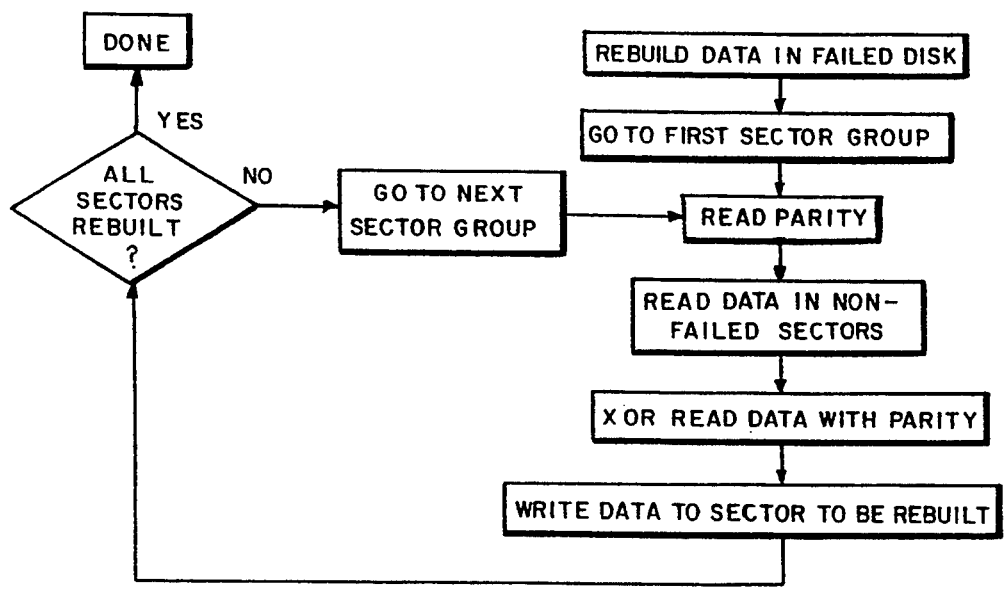
FIG. 9 shows a flow chart for the reconstruction of data in a failed disk.

FIG. 9 depicts an operation for reconstructing, or rebuilding, data in a failed disk. The IOP goes to the first sector group in which a sector of a failed disk is to be reconstructed. The parity entry in that sector group is read, the data in all non-failed sectors of the sector group are read and XOR'ed with the parity entry to provide the reconstructed data. The reconstructed data is then written into the sector of the failed disk which is to be rebuilt. The process is repeated for all data sectors that have to be rebuilt.

What is claimed is:

1. A method for handling data in a system having a control processor for controlling access to an array of data storage disks, wherein storage sectors of a selected number of said disks contains user data and storage sectors of a selected one of said disks contain redundant parity entries which match with the user data entries in the sectors corresponding thereto; corresponding user data and parity sectors in said disks forming identifiable sector groups, wherein said control processor includes a non-volatile, random access-memory (RAM), said method comprising the steps of writing new user data into one or more selected sectors of said data storage disks;

when writing said user data, writing into said non-volatile RAM information identifying the array where said new user data is to be written, identifying the starting sector in said array into which new user data is to be written, and identifying the number of said one or more selected sectors into which said new user data is written; wherein, if a power failure occurs, examining the information in the non-volatile RAM identifying data sectors into which new user data has been written;

determining a new parity entry for data in the corresponding data sectors into which new data has been written;

examining a previous parity entry which has been entered for data in the corresponding data Sectors into which new data has been written; and comparing the previous parity entry and the new parity entry.

2. A method in accordance with claim 1 and further including the steps wherein if a power failure occurs, examining the information in the non-volatile RAM identifying the sectors into which new user data has been written;

determining the parity entries in the corresponding parity sectors of the groups of sectors into which new data has been written; and matching the parity entries in each corresponding sector group with the user data stored in the corresponding user data sectors of each said corresponding sector group.

3. A method in accordance with claim 1 and further including the steps of determining whether or not said non-volatile RAM contains any information concerning the writing of new user data into any sectors of said disks; and if said non-volatile RAM contains no such information, verifying whether the parity entry in the parity sector of each sector group matches with the user data in the corresponding user data sectors of the corresponding sector group.

4. A method in accordance with claim 3 and further including the steps wherein, if a mismatch occurs in a sector group, correcting the parity entry in the parity sector of said sector group to provide a parity entry therein which correctly matches the user data in the user data sectors of said sector group, said determining, verifying, and correcting steps being performed by said control processor when a host processor is performing operations which do not require the use of said control processor.

5. A method in accordance with claim 4 and further wherein, if data cannot be read from a data sector of a sector group, the parity entry for that sector group is identified as an invalid entry.

6. A method in accordance with claim 1 and further including if the previous parity entry and the new parity entry do not match, entering the new parity entry for the corresponding data sectors in which new data has been written.

* * * * *

UNITED STATES PATENT AND TRADEMARK OFFICE
CERTIFICATE OF CORRECTION

PATENT NO. : 5,452,444
DATED : September 19, 1995
INVENTOR(S) : Solomon et al.

It is certified that error appears in the above-indentified patent and that said Letters Patent is hereby corrected as shown below:

Cover page, item [54], line 1, and column 1, change, "FLIGH" to --HIGH--.

On the Cover page, column 2, under *Attorney, Agent, or Firm,* please change "Brain" to --Brian--.

Signed and Sealed this

Second Day of January, 1996

Attest:

BRUCE LEHMAN

*Attesting Officer*  Commissioner of Patents and Trademarks